No. 669,133. Patented Mar. 5, 1901.
F. C. AVERY.
DRIVING GEAR FOR MOTOR VEHICLES.
(Application filed Dec. 1, 1899.)
(No Model.) 3 Sheets—Sheet 1.
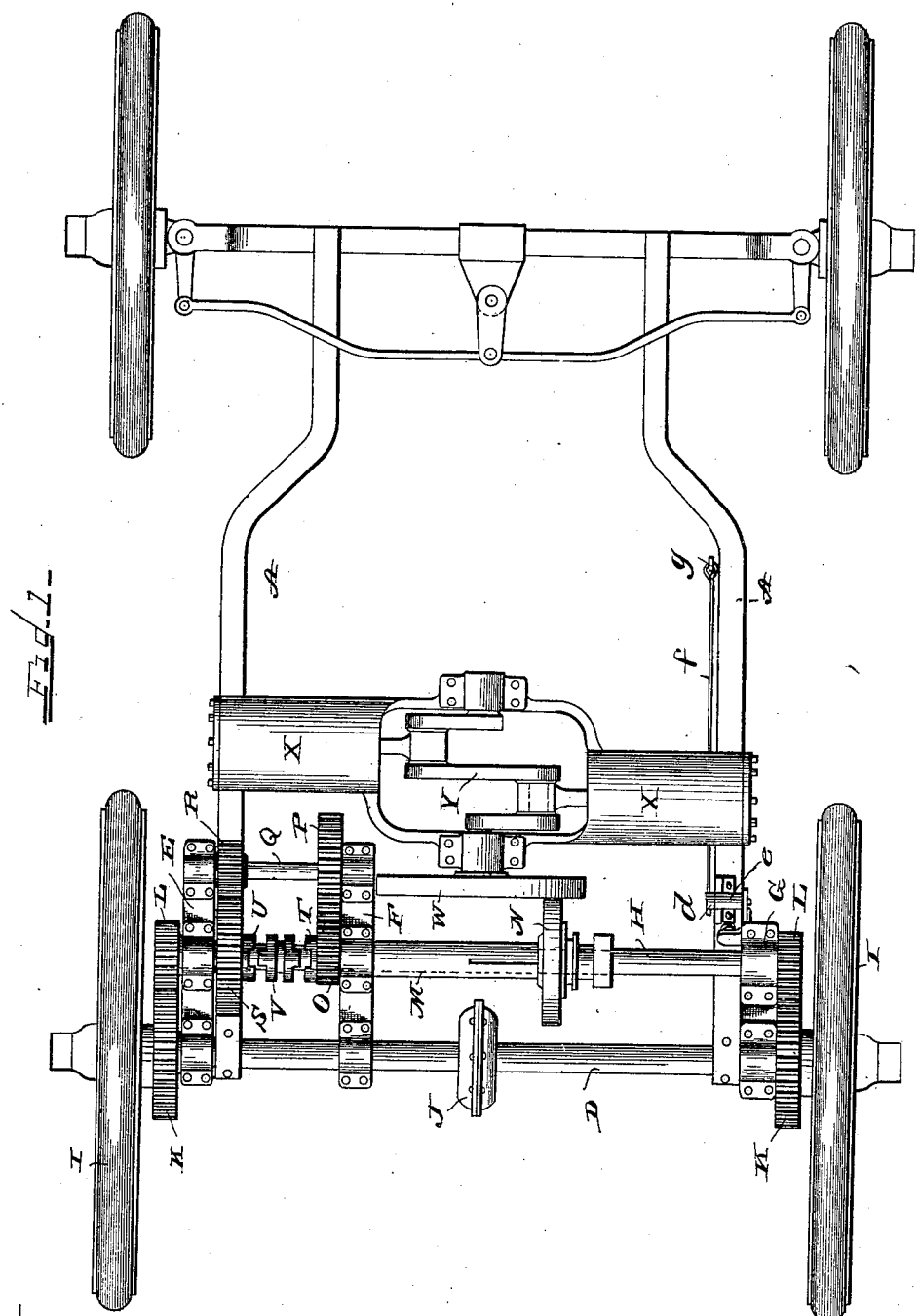

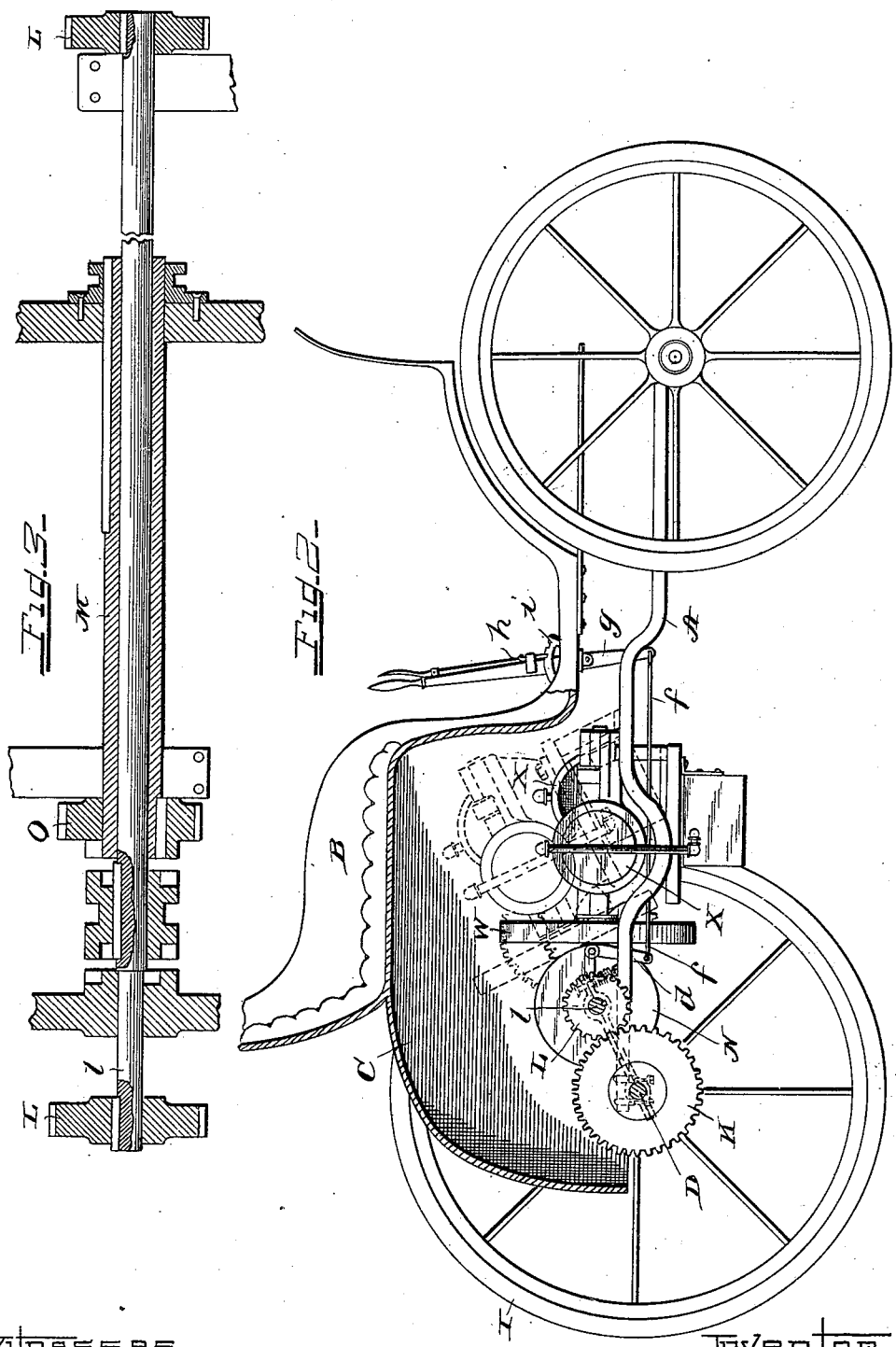

No. 669,133. Patented Mar. 5, 1901.
F. C. AVERY.
DRIVING GEAR FOR MOTOR VEHICLES.
(Application filed Dec. 1, 1899.)
(No Model.) 3 Sheets—Sheet 3.
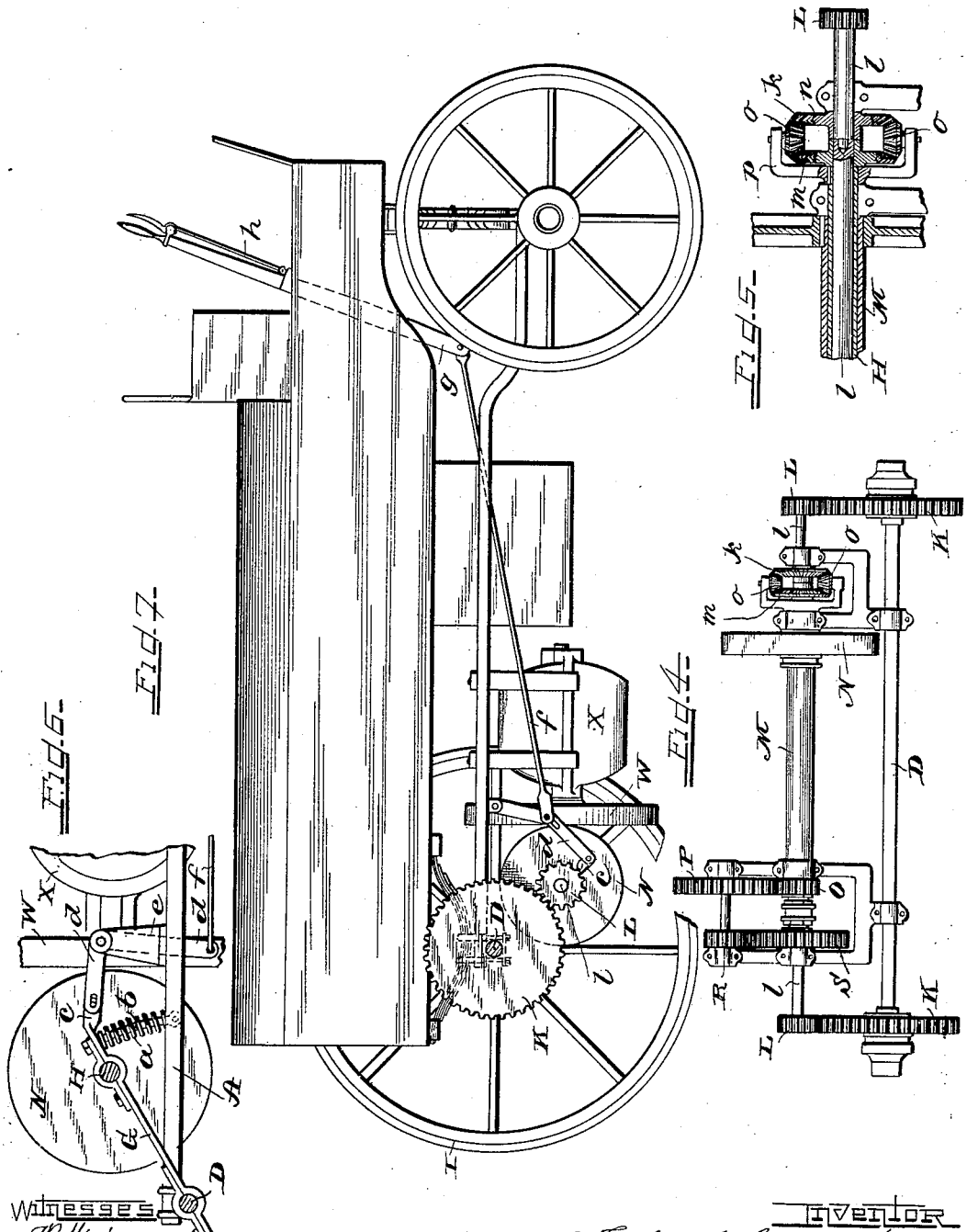

UNITED STATES PATENT OFFICE.

FREDERICK C. AVERY, OF CHICAGO, ILLINOIS.

DRIVING-GEAR FOR MOTOR-VEHICLES.

SPECIFICATION forming part of Letters Patent No. 669,133, dated March 5, 1901.

Application filed December 1, 1899. Serial No. 738,845. (No model.)

*To all whom it may concern:*

Be it known that I, FREDERICK C. AVERY, a citizen of the United States, residing at 6363 Greenwood avenue, Chicago, in the county of Cook and State of Illinois, have invented certain new and useful Improvements in Driving-Gear for Motor-Vehicles, of which the following is a specification.

This invention relates to improvements in driving-gear for motor-vehicles—that is, to the train of gearing transmitting the power from the motor proper to the driven axle of the vehicle.

Prior to my present invention a large number of different kinds of motors, driving-gears, and vehicles have been proposed, in all of which there has been some special construction of either the motor, the gearing, or the vehicle, and invariably the gearing for transmitting the power from the motor to the driven axle of the vehicle has required special construction in its application to different types of vehicles and rearrangement and redisposition of the gearing, as well as of the motor and its connections, to adapt the same for use upon different kinds of vehicles. So far as I am aware no attempt has been made to produce a gearing adaptable equally well for application to all kinds of vehicles and to transmit power from all kinds of motors; but in order to render motor-vehicles commercially practicable such an arrangement is of the utmost necessity and advantage to the builder as well as the user. It is also of importance to have the gearing compact and durable in construction and located where it may best be cared for and is convenient of access and where its weight is not only well balanced on the vehicle, but is most advantageously located for the purposes of traction.

My invention has for its primary object the production of a driving-gear which may be applied to any kind of vehicle and which may be utilized in connection with any kind of motor regardless of the character of the vehicle to which it is applied and the position which the motor is desired to or must occupy upon the vehicle.

Another object of my invention is to have the driving-gear of such character that the motor can be placed in any desired position adjacent to the driven axle without any change whatever in the driving-gear, whereby the driving-gear may be constructed and kept in stock ready for immediate application to a motor-vehicle of any construction driven by any kind of motor, thus affording the greatest possible latitude both in the selection of the motor and its disposition upon the vehicle.

A further object of my invention is to have the driving-gear compact, durable, and simple in construction and located so as to be easy of access for repair and cleaning and where its weight will best promote the traction of the driving-wheels of the vehicle.

These and such other objects as may hereinafter appear are attained by the devices illustrated in the accompanying drawings, in which—

Figure 1 represents a plan view of a motor-vehicle frame, showing a driving-gear applied thereto embodying my invention. Fig. 2 represents a side elevation thereof, showing the rear driving-wheel removed and the body of the vehicle partly broken away. Fig. 3 is a sectional elevation of the main driving-shaft. Fig. 4 is a plan view of a modified form of driving mechanism. Fig. 5 is a detailed section thereof. Fig. 6 is a detailed sectional elevation more clearly showing the means for throwing the driving-gear into and out of position, and Fig. 7 is a side elevation showing my driving mechanism applied to a different kind of vehicle from that shown in Fig. 2.

Similar letters of reference indicate the same parts in the several figures of the drawings.

My driving-gear, as before stated, is applicable to vehicles of any kind of construction, and it may be used for transmitting power from any kind of motor to the driven axle of the vehicle, and it is immaterial how the power from the motor-shaft is communicated to the driving-shaft of my mechanism, but in the drawings, for the purpose of illustration, I have shown the power transmission by means of friction-disks, which are now commonly used in this art.

Referring by letter to the accompanying drawings, and more particularly to Figs. 1, 2, 3, and 6, let A indicate the frame of a vehicle, which may be of any suitable kind or construction adapted to support the body of the vehicle thereon. As shown in Fig. 2, the body B of the vehicle is that of a phaeton, and with such a vehicle it will be found desirable to locate the motor and the driving mechanism in the box C beneath the seat of the vehicle, where it occupies space not needed for other purposes. The frame of the vehicle, whether it comprise the side bars shown in the drawings or is otherwise constructed, is supported at its rear end upon the rear or driven axle D of the vehicle, and ordinarily the body of the vehicle would be supported upon suitable springs (not shown) interposed between it and the frame. Upon the axle I mount a supplemental frame constituting the support of my driving mechanism and comprising, when constructed to support the mechanism shown in Figs. 1, 2, 3, and 6, the three parallel arms E, F, and G, each of which constitutes a bearing for the driving-shaft H of the driving-gear and each of which is loosely mounted at one end upon the driven axle. The driven axle may be stationary and the wheels I revolve loosely thereon, or the wheels I may be fast upon the axle, so that it will turn therewith, and when the axle rotates it should be divided, as usual, and provided with some suitable differential mechanism, many types of which are now well known in this art, located, say, in the casing J, whereby the ends of the axle may turn independently of each other, which is a practical necessity in this class of vehicles to enable them to make short turns without the necessity for throwing out of gear any part of the driving mechanism.

Upon the driven axle D or upon the wheels I are rigidly mounted the gears K, with which mesh pinions L, rigidly mounted upon the ends, respectively, of the driving-shaft H. Upon the driving-shaft H, about the center of length thereof, is a loose sleeve M, having mounted upon one end thereof a friction-wheel N, by means of which the sleeve is rotated, said wheel having a splined feature or like connection with the sleeve, so that it may slide longitudinally thereon, but cannot rotate independently thereof. Upon the opposite end of the sleeve is mounted a pinion O, meshing with a gear P, rigidly secured to a counter-shaft Q, loosely journaled in the ends of the parallel bars E and F. On said shaft Q is rigidly secured the pinion R, meshing with a gear-wheel S, loosely mounted upon the driving-shaft H, adjacent to the end of the sleeve M on said shaft. On the end of the sleeve or on the hub of the pinion O is a half-clutch T, a like half-clutch U being formed upon the hub of the gear-wheel S. Upon the driving-shaft H, between the half-clutches T and U, is splined a double clutch V, adapted to alternately engage the half-clutches T and U. It will thus be seen that when the friction-wheel N is rotated, causing a corresponding rotation of the sleeve M and pinion O, if the clutch V be moved into engagement with the half-clutch T the sleeve and the shaft H will be directly locked together and will rotate in unison, thus directly driving at full speed the driven axle of the vehicle through the intermediary of the gears K and L upon said shaft and axle, respectively. If, however, the clutch V is shifted so as to engage the half-clutch U, then the driving of the shaft H will be through the pinion O, gear P, pinion R, and gear S, and by reason of the proportions between the different wheels of this chain of gears the speed at which the driving-shaft will be rotated will be reduced according to the proportion between the various gear-wheels in the chain. Thus it will be seen that the power imparted to the driving mechanism can be transmitted to the driven axle of the vehicle at two different speeds by simply shifting the clutch V, so that when starting up or when the vehicle is heavily loaded or climbing a hill the driving-gear can be readily shifted so as to lower the speed at which the vehicle travels and make a corresponding gain in power without changing the speed at which the motor is operated. It is intended that through suitable levers, that are so well known in this art as to not require illustration, the shifting of the clutch V may be effected by the driver from his seat in the vehicle to give either the maximum power or the maximum speed to the vehicle or to bring the same to a standstill by shifting the clutch to the mid-position shown in the drawings, out of engagement with both of the half-clutches. The shifting of the friction-wheel N on the sleeve to vary the speed of transmission of power from the motor to the driving-shaft H is also intended to be accomplished in the same way as the shifting of the clutch, this control being entirely separate and independent from the control obtained through the clutch.

As shown in the drawings, the friction-wheel N is driven by engagement with a friction-disk W, driven by the motor, which in this case is shown as duplex, consisting of a pair of engines disposed on opposite sides of the center of the vehicle-frame and each working through its pitman on the double crank Y in the shaft carrying the friction-disk. Indeed the arrangement of the driving-gear and these motors, which are shown as of the gasolene type, is so compact that the greatest possible traction is given to the driven wheels of the vehicle, the weight is very evenly distributed and well balanced upon the vehicle, and ample room is left upon the frame of the machine to employ even one or more of the motors, all working upon the same power-shaft, which arrangement would effect great economy in the operation of the machine, enabling the ready control and application of the power according to the load to be carried or the character of the road upon which the vehicle is running. In this friction-transmission type it is desirable to throw the driving mechanism out of gear with the motor when the engine is at rest or when repairs to either the motor or driving mechanism are necessary and for other obvious purposes, and such operation should be under the control of the driver. To this end I have provided a yielding support for the free end of the frame of the driving mechanism, which frame comprises the arms E, F, and G, and, it will be borne in mind, is pivoted at one end upon the axle D. Between the opposite free end of the arm G, and, if desired, also of the arm E, and the frame-bar A of the vehicle, or any stationary part thereof, is confined a coiled spring $a$, mounted on a curved rod $b$, pivotally secured to the frame-bar and passing freely through the arm, which latter is slightly prolonged, as at C, and has a pin-and-slot connection with one arm of a bell-crank lever $d$, pivoted in a suitable bracket $e$, secured to the frame-bar A or some other suitable stationary part of the frame. The other arm of the bell-crank lever is connected by a rod $f$ with some suitable device located within convenient reach of the hand or foot of the driver of the vehicle, whereby the bell-crank lever may be rocked upon its pivot, and thus lift or lower the frame of the driving mechanism, swinging the same upon its pivot and moving the friction-wheel N into or out of contact with the friction-disk. As an appropriate means for accomplishing this operation I have provided the hand-lever $g$, suitably pivoted to the vehicle-body and provided with an ordinary spring-actuated latch $h$, adapted to engage a toothed segment $i$, secured to the vehicle-body. The normal tendency of the spring $b$ is to throw the mechanism out of gear—that is, to separate the friction-wheel from the friction-disk—and in the mechanism shown the spring is practically wholly relied upon to accomplish this object, although with a proper amount of stiffness in the rod $f$ it would not be necessary to place such reliance upon the spring. When, however, it is desired to throw the driving mechanism into gear with the motor, the driver can instantly do so by drawing the lever back to the position shown in Fig. 2 and locking the same.

As before stated, the kind of motor which it is desired to employ, whether gasolene, electric, or other kind, is immaterial, and it is also immaterial how the power is transmitted from the power-shaft of the motor to the driving-shaft of the driving mechanism, and obviously instead of employing the friction transmission shown in the drawings a sprocket wheel and chain connection or any other form of gear connection may be employed and the motors may be placed anywhere upon the vehicle best adapted for their support and operation, as well as for convenience of access. So, also, may the character of the driving mechanism be changed without departing from the spirit of my invention, so long as it is capable of operation by any kind of motor and in any radial position about the driven axle of the vehicle.

In Figs. 4 and 5 I have shown a driving-gear which forms the subject-matter of another application filed by me of even date herewith, in which the general features of the gearing and the general mode of transmission of power and control thereof from the motor to the driven axle are the same as that already described, the principal difference being in the peculiar construction and arrangement of the driving-shaft and the inclusion in the driving mechanism of the differential gearing $k$, by means of which a differential speed may be imparted to the ground-wheels of the vehicle in turning. In this construction the sleeve M and the train of gear-wheels O, P, R, and S are retained, operated and controlled in the same manner as before explained; but the driving-shaft proper, H, is hollow or tubular and incloses a sectional or divided shaft $l$, which carries on the ends of its respective sections the pinions L, meshing with the gear-wheels K upon the hubs of the driven wheels I, the axle D in this instance being preferably stationary. The sections of the shaft $l$ have rigidly mounted upon their opposing ends, respectively, the beveled gears $m$ and $n$, with both of which mesh beveled gears $o$, loosely journaled in a yoke $p$, secured on the end of the driving-shaft H. Thus it will be seen that when the vehicle is traveling in a straight line the gears $o$ will cause simultaneous rotation of the gears $m$ and $n$ and consequently rotation in unison of the sectional shaft $l$ and the driving-shaft H; but when the vehicle is turning in either direction one of the ground or driven wheels must outtravel the other, and the differential gear between the sectional shaft and the driven shaft permits of this operation, the motion lost in one section of the sectional shaft being simply transmitted to the other. I do not desire to herein claim this particular form of driving mechanism, having illustrated it only for the purpose of showing the wide application of my invention.

One of the most essential features of my invention is the hanging of the complete driving mechanism upon the rear or driven axle in such manner that the mechanism will transmit power to the driven axle or to the ground-wheels thereon no matter in what radial position it is secured, thus adapting the driving mechanism for application to any kind of vehicles without any change therein and also enabling the placing of the motor at any desired point or in any desired position upon the vehicle. While in Figs. 1 and 2 the motor is shown as placed slightly above the vehicle-frame and beneath the seat of the style of vehicle therein shown and the driving mechanism is shown as lying in a normally upwardly-inclined position, in Fig. 7 I have shown my mechanism applied to a truck and above the motor and the driving-gear suspended below the rear axle, as well as the frame of the truck, and completely outside of the body of the truck, which may thus be made as low in its framing as possible. Here also the motor is shown as an electric motor simply for the purpose of illustration, and the transmission is by friction; but neither of these features is intended in any way as a limitation upon my invention. It is equally apparent that the driving mechanism might be swung to a position vertically above or below the rear axle or in any radial position back of the rear axle, such arrangement being entirely at the election of the builder and depending upon the kind of vehicle to which the driving mechanism is applied and the location it is desired to give to the motor. The adjustability of the driving mechanism to these various positions is of the utmost importance to the commercial value and practicability of motor-vehicles, because it enables the manufacturing of the driving mechanism of such vehicles complete, so that they may be kept in stock and sold as a complete mechanism for use in in connection upon any kind of vehicle and with any kind of motor without any change whatever in the driving-gear except the selection of the proper gear for connection with the motor, according to the kind of transmission desired.

Of course the driving mechanism, as well as the motors, may be inclosed in a suitable dust-proof casing which will not be either large or unsightly, as the driving mechanism is compact and not spread out in the usual way.

Having thus fully described my invention, what I claim, and desire to secure by Letters Patent, is—

1. The combination with a motor-vehicle having its motor held in fixed position thereon, of a driving mechanism independent of said motor and pivotally supported upon the axle of said vehicle and adjustable to any radial position with relation to said axle, said mechanism having an operative connection with the motor in but one of its adjusted positions, substantially as and for the purpose described.

2. The combination with a motor-vehicle and its motor, of a driving mechanism independent of the motor and pivotally supported upon the axle of said vehicle and adjustable to any radial position thereon and a gear connection between the driving-shaft of said mechanism and the power-shaft of the motor for transmitting power from said motor through said mechanism to the driven wheels of the vehicle, said connection being broken by the pivotal movement of the mechanism, substantially as described.

3. The combination with a motor-vehicle, of a driving mechanism comprising a driving-shaft, connections between the motor and the driving-shaft, a gear connection between said shaft and the driven wheels of the vehicle, a frame in which said shaft is journaled and a pivot connection between said frame and the axle of the vehicle, and means for moving said frame on its pivot, said movement releasing the connection between the motor and the driving-shaft, substantially as described.

4. The combination with a motor-vehicle, of a driving mechanism independent of and operated by the motor, said mechanism comprising a driving-shaft, a gear connection between said shaft and the driven wheels of the vehicle, a frame in which said shaft is journaled, a pivot connection between said frame and the axle of the vehicle, a friction device mounted on the driving-shaft to operatively connect said shaft and the motor, a yielding support for said frame and means for swinging said frame upon the axle, said swinging movement causing said friction device to become inoperative, substantially as described.

5. The combination with a motor-vehicle and its motor, of a driving mechanism comprising a driving-shaft, a gear connection between said shaft and the driven wheels of the vehicle, a frame in which said shaft is journaled, a pivot connection between said frame and the vehicle-axle, a friction disk and wheel connection between the driving-shaft and the motor, springs normally tending to separate the friction wheel and disk and means for moving and locking said parts in contact, substantially as described.

FREDERICK C. AVERY.

Witnesses:
C. L. WOOD,
M. E. SHIELDS.